United States Patent [19]

Takada et al.

[11] Patent Number: 5,682,261

[45] Date of Patent: Oct. 28, 1997

[54] PROTONIC CONDUCTOR AND ELECTROCHEMICAL ELEMENT USING THE SAME

[75] Inventors: Kazunori Takada, Osaka; Shigeo Kondo, Hirakata; Tsutomu Minami, Osakasayama; Masahiro Tatsumisago, Sakai; Yasumasa Takeuchi, Yokohama, all of Japan

[73] Assignees: Matsushita Electric Industrial Co., Ltd., Osaka-fu; Japan Synthetic Rubber Co., Ltd., Tokyo, both of Japan

[21] Appl. No.: 583,254

[22] Filed: Jan. 5, 1996

[30] Foreign Application Priority Data

Mar. 7, 1995 [JP] Japan .................................. 7-047432

[51] Int. Cl.⁶ .......................................................... G02F 1/00
[52] U.S. Cl. .............................. 359/321; 359/270; 359/273
[58] Field of Search .................................... 359/270, 273, 359/321

[56] References Cited

U.S. PATENT DOCUMENTS

| 4,167,457 | 9/1979 | Giner | 205/618 |
| 4,221,044 | 9/1980 | Godejahn et al. | 437/47 |
| 5,541,015 | 7/1996 | Tajima et al. | 429/26 |

FOREIGN PATENT DOCUMENTS

| 60-263923 | 12/1985 | Japan . |
| 4-011608 A | 1/1992 | Japan . |

OTHER PUBLICATIONS

M. Tatsumisago et al.; "Preparation of Proton–Conducting Amorphous Films Containing Dodecamolybdophosphoric Acid by the Sol–Gel Method"; *J. Am. Ceram. Soc.*, 72 [3], pp. 484–486 (1989).

M. Tatsumisago et al.; "Preparation and proton–conduction of silica gels containing heteropoly acids"; *Solid State Ionics* 59 (1933), pp. 171–174.

M. Tatsumisago et al.; "Proton–conducting silica–gel films doped with a variety of electrolytes"; *Solid State Ionics* 74 (1994), pp. 105–108.

M. Tatsumisago et al.; "Proton Conduction of Acid/Salt Doped Silica Gels"; *Journal of the Ceramic Society of Japan* 103 [2], pp. 189–190 (1995).

H. Honjo et al.; "Electrochromic cell using salt–doped silica gel films as a solid electrolyte"; *Journal of Materials Science Letters* 14 (1995), pp. 783–784.

*Primary Examiner*—David C. Nelms
*Assistant Examiner*—Thomas Robbins
*Attorney, Agent, or Firm*—Panitch Schwarze Jacobs & Nadel, P.C.

[57] ABSTRACT

A protonic conductor comprises a silicon oxide doped with a Brønsted acid and a thermoplastic elastomer. It has excellent protonic conductivity, which is not substantially lowered even in a dry atmosphere and thereby ensures excellent working properties.

9 Claims, 4 Drawing Sheets

PROTONIC CONDUCTOR AND ELECTROCHEMICAL ELEMENT USING THE SAME

BACKGROUND OF THE INVENTION

1. Field of the Invention

The present invention relates to a protonic conductor, which uses protons as a species of conducting ions, and also to an electrochemical element, such as a fuel cell, using such a protonic conductor.

2. Description of the Prior Art

Solid substances with ions moving therein have been intensively studied as prospective material for cells and other electrochemical elements. Ionic conductors found so far include various species of conducting ions, such as $Li^+$, $Ag^+$, $Cu^+$, $H^+$, and $F^-$. Ionic conductors with proton ($H^+$) functioning as a species of conducting ions are expected to be utilized in various electrochemical elements including fuel cells and electrochromic display elements as shown below.

The reaction expressed by Equation (1) given below proceeds in fuel cells using gaseous hydrogen as a fuel. Protons generated through this reaction move in the electrolyte and are consumed at the air electrode by the reaction expressed by Equation (2) given below. Application of a protonic conductor as an electrolyte allows construction of fuel cells using gaseous hydrogen as a fuel.

$$H_2 \rightarrow 2H^+ + 2e^- \qquad (1)$$

$$\tfrac{1}{2}O_2 + 2H^+ \rightarrow H_2O \qquad (2)$$

Polymer electrolyte fuel cells using an ion-exchange membrane as the protonic conductor have been developed extensively and are expected as prospective power sources for stationery applications and on electric vehicles.

Oxides of transition metals, such as tungsten oxide and molybdenum oxide, chance color by the flow of protons into and out of the ion site in the crystal lattices. For example, tungsten oxide is faded yellow in general state but chances to blue by insertion of protons into the crystal lattices by the electrochemical reaction expressed by Equation (3) given below. This reaction is reversible, so that oxides of transition metals are usable as materials of display elements (electrochromic display elements) and light adjustment glass. In such applications, the protonic conductive substance should be used as an electrolyte.

$$WO_3 + XH^+ + Xe^- \rightarrow H_xWO_3 \qquad (3)$$

A variety of electrochemical elements can be prepared using the protonic conductor as an electrolyte. The protonic conductor used to construct the electrochemical elements is required to show a high protonic conductivity at room temperature. Known examples of such protonic conductors include inorganic substances like urenylphosphoric acid hydrate and molybdophosphoric acid hydrate, and organic substances like high-molecular ion-exchange membranes with perfluorosulfonic acid-containing side chains bound to vinyl fluoride polymers.

The inorganic protonic conductors, in which protons contained in water of crystallization contribute to electric conduction, have a problem of lowered protonic conductivity due to the elimination of water of crystallization at a high temperature.

Among various electrochemical elements using the protonic conductor, fuel cells are prospective power sources for stationery applications and on electric vehicles for generating relatively large current. For that purpose, forming solid electrolyte layers of large area is required.

One of the advantages of electrochromic display elements is a wide field of vision. Electrochromic display elements do not use polarizers unlike liquid crystal display elements, thereby realizing recognition in a wide angle range. This characteristic makes the electrochromic display elements effective for display of large area, compared with other display elements such as liquid crystal display elements. Forming electrolyte layers of large area is thus essential for this application.

There are several known techniques applicable to prepare thin films of inorganic substances, for example, vapor deposition and casting.

The method of preparing thin films by vapor deposition, however, requires a relatively high cost and has difficulty in producing thin films of large areas.

The casting technique gels a protonic conductor-containing sol cast on a substrate to yield a thin film of the protonic conductor having a large area. The thin films prepared by this casting technique, however, have pores formed during evaporation of a solvent. In application of the protonic conductor to fuel cells, since the active materials in fuel cells are gaseous hydrogen and gaseous oxygen, these gases may pass through the pores formed in the protonic conductor gel, thereby lowering the efficiency of power generation.

One method proposed for solving the above problem and preparing an electrolyte layer of large area adds a thermoplastic resin to polymer electrolyte powder.

The method of adding a thermoplastic resin to a compound centering protonic conduction by means of water of crystallization, however, causes the thermoplastic resin to interfere with the hopping movement of protons between molecules of water of crystallization, thus lowering the protonic conductivity.

Ion exchange membranes have thin films of large area with excellent working properties by a relatively simple process but at a rather high cost. Development of low cost protonic conductors has accordingly been highly demanded. Ion-exchange resins show high ionic conductivity only in a range of high water content (several tens percent) and decrease the protonic conductivity under dry conditions.

SUMMARY OF THE INVENTION

The primary object of the present invention is to provide a protonic conductor having excellent protonic conductivity, which is not substantially lowered even in a dry atmosphere.

Another object of the present invention is to provide an electrochemical element using such a protonic conductor.

The present invention is directed to a protonic conductor comprising a silicon oxide doped with a Brønsted acid and a thermoplastic elastomer.

In accordance with one preferable embodiment, the Brønsted acid comprises phosphoric acid or a derivative thereof.

In accordance with another preferable embodiment, the Brønsted acid comprises perchloric acid or e derivative thereof.

It is also preferable that the silicon oxide doped with the Brønsted acid is synthesized by a sol-gel method.

The present invention is also directed to an electrochemical element using the protonic conductor described above.

The present invention provides a protonic conductor having excellent protonic conductivity, which is not substantially lowered even in a dry atmosphere.

The electrochemical element using such a protonic conductor also has excellent properties.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
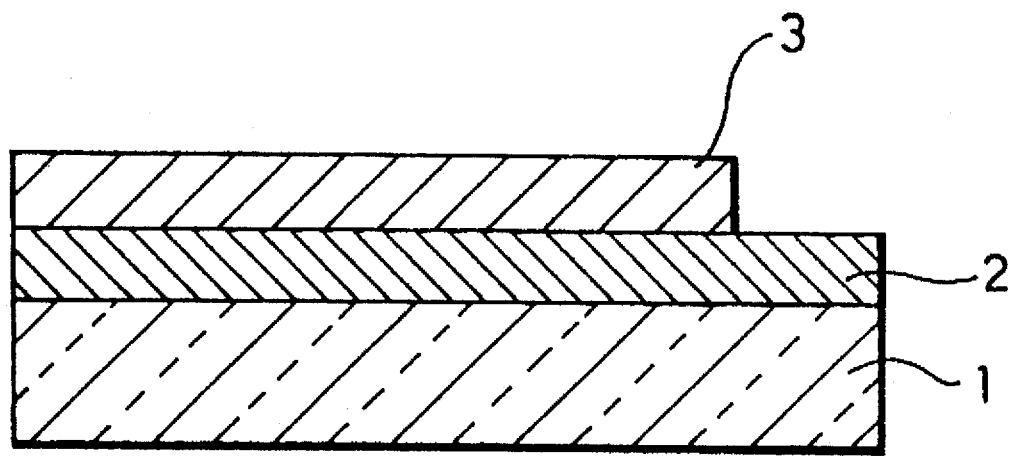
FIG. 1 is a vertical cross-sectional view illustrating a working electrode 4 included in an electrochromic display element of Example 9.

Silicon oxide includes —OH groups as its surface terminal croup, where protons in the —OH groups contribute to ionic conduction. A Brønsted acid added to silicon oxide acts as a donor of protons to silicon oxide. This increases the concentration of moveable ions and thereby realizes high protonic conductivity.

A thermoplastic elastomer on the surface of such a protonic conductor generates an interaction between the —OH croup and the thermoplastic elastomer, thereby forming a favorable proton conductive layer on the interface therebetween. This gives a protonic conductor having flexibility and good working properties while maintaining the high ionic conductivity.

One typical example of known protonic conductors using silicon oxide is silica gels with sulfuric acid carried on the surface thereof. In the protonic conductor obtained in the present invention, the position of an —OH group-induced absorption band in infrared absorption spectra varies with the concentration of the Brønsted acid added. This means that the protonic conductor of the present invention does not simply carry an acid on the surface thereof but is formed as a compound of silicon oxide and a Brønsted acid.

Substances causing protonic conduction by means of water of crystallization neutrally lose the water in a dry atmosphere, which results in the lowered protonic conductivity. In the protonic conductor of the present invention, on the other hand, protonic conduction mainly arises from the —OH groups bonded to the surface of silicon oxide. The chemically bound —OH groups are not easily eliminated even in a dry atmosphere, whereby the protonic conductivity of the protonic conductor is maintained at a substantially constant level.

Phosphoric acid and its derivatives are trivalent Brønsted acids. Protonic conductors synthesized with such trivalent Brønsted acids have high ionic conductivity because of the high proton concentration. Phosphoric acid and its derivatives are thus especially preferable for the Brønsted acid used in the present invention.

Perchloric acid shows a prominent section as a proton donor. Addition of this Brønsted acid for doping silicon oxide gives a protonic conductor with high protonic conductivity. Perchloric acid is thus also especially preferable for the Brønsted acid of the present invention.

Substantially all the —OH groups bonded to silicon oxide exist On the surface of silicon oxide. The compound of silicon oxide and a Brønsted acid synthesized by the sol-gel method has a high specific surface area and e high density of —OH groups, thereby possessing excellent protonic conductivity. This shows that the sol-gel method is preferably used for synthesizing the protonic conductor of the present invention.

The protonic conductor thus obtained forms a thin film of a large area by a relatively simple process, thereby being preferably applicable to an electrolyte of electrochemical elements.

The present invention will be described more specifically presenting some examples.

[EXAMPLE 1]

For preparation of a protonic conductor in Example 1, a silica gel doped with phosphoric acid was used as a silicon oxide doped with a Brønsted acid and styrene-ethylene-butene-styrene copolymer (hereinafter referred to as SEBS) prepared by hydrogenating styrene-butadiene-styrene copolymer as a thermoplastic elastomer.

The silica gel doped with phosphoric acid was prepared in the following manner.

Tetraethoxysilane (hereinafter referred to as TEOS) used as a starting material for the synthesis of silica gel was diluted with ethanol; the molar ratio of TEOS to ethanol was adjusted to 1:4. Pure water, a 3.6% by weight of aqueous hydrochloric acid, and tetraethylammonium tetrafluoroborate were further added to the ethanol solution of TEOS at the molar ratio of 8, 0.01 (as HCl), and 0.01 to TEOS and stirred for 5 minutes. After addition of an 85% by weight of aqueous phosphoric acid at the molar ratio of TEOS to $H_3PO_4$ of 1:0.5, the mixture was stirred in a sealed vessel for 3 hours. The solution was left 5 hours for gelation and dried under reduced pressure at 60° C. for 2 hours to yield a silica gel doped with phosphoric acid.

The phosphoric acid-doped silica gel thus synthesized was ground and then added with stirring to toluene with SEBS dissolved therein. The resultant weight ratio of silica gel to SEBS was 20:1. A protonic conductor was obtained by stirring the mixture to evaporate toluene.

The ionic conductivity of the protonic conductor thus prepared was measured according to the method described below.

An electrode used for measuring electric conductivity was prepared by pressure-molding 200 mg of the protonic conductor to a disk-shaped pellet of 10 mm diameter and pressure-welding gold foil to both surfaces of the pellet. The electric conductivity of the protonic conductor was measured at room temperature by the alternating current impedance method using the electrochemical cell thus prepared. The measurement of Example 1 revealed the ionic conductivity of $2.9 \times 10^{-3}$ S/cm.

The protonic conductor was kept in a desiccator using diphosphorus pentoxide as a desiccant for 7 days. Measurement of the protonic conductor after being kept in dry atmosphere showed nonsignificant decrease in electric conductivity.

The protonic conductor obtained in Example 1 had high ionic conductivity, which was not substantially lowered even in a dry atmosphere.

[EXAMPLE 2]

Instead of phosphoric acid used in Example 1, perchloric acid was used for the Brønsted acid of the protonic conductor in Example 2.

In the same manner as in Example 1, pure water and hydrochloric acid were added to TEOS diluted with ethanol. The molar ratio of TEOS to ethanol to pure water to hydrochloric acid was 1:8:4:0.05. Perchloric acid was then added to the solution until occupying 20% of the expected weight of the resultant perchloric acid-doped silica gel. The solution mixture was stirred at room temperature for 3 hours, left 5 hours for gelation, and dried under reduced pressure at 60° C. for 2 hours to yield a silica gel doped with perchloric acid.

A toluene solution of SEBS was added with stirring to the perchloric acid-doped silica gel thus synthesized. The resultant weight ratio of SEBS to silica gel was 1:50. A protonic conductor was obtained by stirring the mixture to evaporate toluene.

The ionic conductivity of the protonic conductor thus prepared was measured in the same manner as in Example 1.

The measurement of Example 2 revealed the ionic conductivity of $3.2 \times 10^{-2}$ S/cm. Measurement of the protonic conductor after being kept in a dry atmosphere showed no significant decrease in electric conductivity.

The protonic conductor obtained in Example 2 had high ionic conductivity, which was not substantially lowered even in a dry atmosphere.

[EXAMPLE 3]

Instead of phosphoric acid used in Example 1, dodecatungstophosphoric acid ($H_3PW_{12}O_{40} \cdot 29H_2O$), one of the derivatives of phosphoric acid, was used for the Brønsted acid of the protonic conductor in Example 3.

A silica gel doped with tungstophosphoric acid was prepared in the same manner as in Example 2 except that dodecatungstophosphoric acid was used in place of perchloric acid. Dodecatungstophosphoric acid was added to the mixture of TEOS, ethanol, pure water, and hydrochloric acid until occupying 45% of the expected weight of the resultant tungstophosphoric acid-doped silica gel.

A toluene solution of SEBS was added with stirring to the tungstophosphoric acid-doped silica gel thus synthesized. The resultant weight ratio of SEBS to silica gel was 1:70. A protonic conductor was obtained by stirring the mixture to evaporate toluene.

The ionic conductivity of the protonic conductor thus prepared was measured in the same manner as in Example 1.

The measurement of Example 3 revealed the ionic conductivity of $2.1 \times 10^{-3}$ S/cm. This means that the protonic conductor obtained in Example 3 had high ionic conductivity.

[EXAMPLE 4]

A protonic conductor was prepared in the same manner as in Example 3 except that dodecamolybdophosphoric acid ($H_3PMo_{12}O_{40} \cdot 29H_2O$), one of the derivatives of phosphoric acid, was used for the Brønsted acid, instead of phosphoric acid used in Example 1.

The ionic conductivity of the protonic conductor thus obtained was measured in the same manner as in Example 1. The measurement of Example 4 revealed the ionic conductivity of $1.8 \times 10^{-3}$ S/cm. This means that the protonic conductor obtained in Example 4 had high ionic conductivity.

[EXAMPLE 5]

A protonic conductor was prepared in the same manner as in Example 3 except that silicon isopropoxide was used as the material for producing silicon oxide, instead of TEOS used in Example 1.

The ionic conductivity of the protonic conductor thus obtained was measured in the same manner as in Example 1. The measurement of Example 5 revealed the ionic conductivity of $1.5 \times 10^{-3}$ S/cm. Measurement of the protonic conductor after being kept in a dry atmosphere showed nonsignificant decrease in electric conductivity.

The protonic conductor obtained in Example 5 had high ionic conductivity, which was not substantially lowered even in a dry atmosphere.

[EXAMPLE 6]

A protonic conductor was prepared in the same manner as in Example 1 except that the amount of SEBS used as the thermoplastic elastomer was chanced.

A silica gel doped with phosphoric acid was synthesized in the same manner as in Example 1. A toluene solution of SEBS was added with stirring to the phosphoric acid-doped silica gel. The resultant weight ratio of SEBS to silica gel was 1:50. A protonic conductor was obtained by stirring the mixture to evaporate toluene.

The ionic conductivity of the protonic conductor thus prepared was measured in the same manner as in Example 1.

The measurement of Example 6 revealed the ionic conductivity of $4.7 \times 10^{-3}$ S/cm. Measurement of the protonic conductor after being kept in a dry atmosphere showed nonsignificant decrease in electric conductivity.

The protonic conductor obtained in Example 6 had high ionic conductivity, which was not substantially lowered even in a dry atmosphere.

[EXAMPLE 7]

A protonic conductor was prepared in the same manner as in Example 1 except that a hydrogenated styrene-butediene copolymer (DYNARON 0900P manufactured by Japan Synthetic Rubber Co., Ltd.) was used as the thermoplastic elastomer, instead of SEBS used in Example 1.

The ionic conductivity of the protonic conductor thus prepared was measured in the same manner as in Example 1. The measurement of Example 7 revealed the ionic conductivity of $3.2 \times 10^{-3}$ S/cm. Measurement of the protonic conductor after being kept in a dry atmosphere showed nonsignificant decrease in electric conductivity.

The protonic conductor obtained in Example 7 had high ionic conductivity, which was not substantially lowered even in a dry atmosphere.

[EXAMPLE 8]

A protonic conductor was prepared in the same manner as in Example 1 except that a styrene-butadiene block copolymer (TR 2000 manufactured by Japan Synthetic Rubber Co., Ltd.) was used as the thermoplastic elastomer, instead of SEBS used in Example 1.

The ionic conductivity of the protonic conductor thus prepared was measured in the same manner as in Example 1. The measurement of Example 8 revealed the ionic conductivity of $2.5 \times 10^{-3}$ S/cm. Measurement of the protonic conductor after being kept in a dry atmosphere showed nonsignificant decrease in electric conductivity.

The protonic conductor obtained in Example 8 had high ionic conductivity, which was not substantially lowered even in a dry atmosphere.

[EXAMPLE 9]

An electrochromic display element was prepared from the protonic conductor of Example 1. The process of preparation is described with the accompanying drawings of FIG. 1 and FIG. 2.

Figure 2:
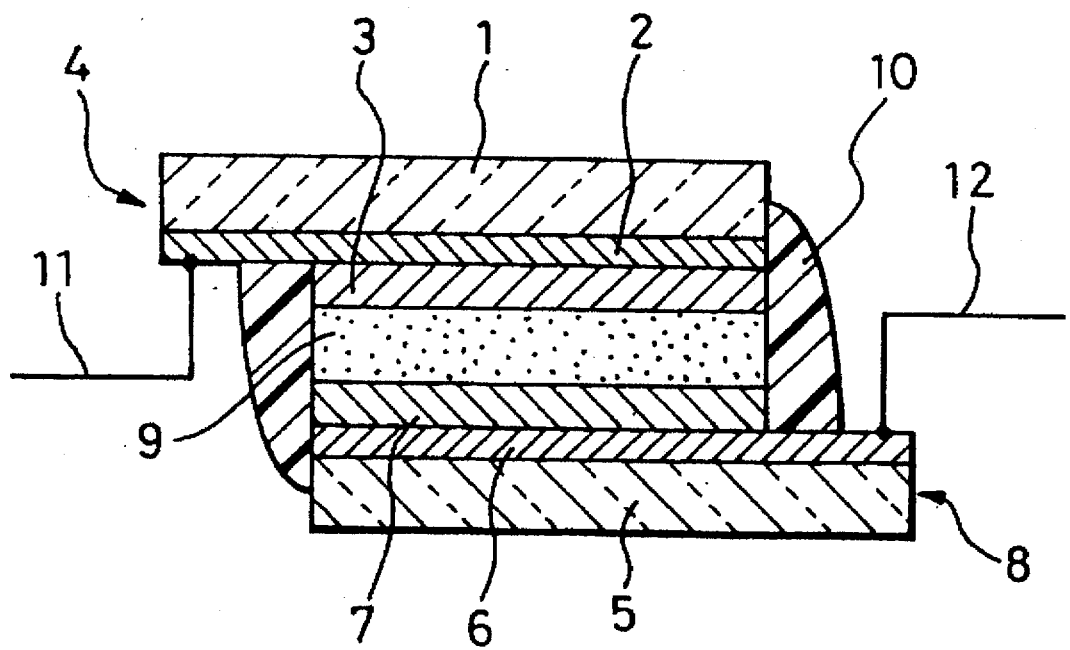
FIG. 2 is a vertical cross-sectional view illustrating the structure of the electrochromic display element prepared in Example 9.

In this example, a thin film of tungsten oxide ($WO_3$) was used as a working electrode 4 of the electrochromic display element (see FIG. 2). The working electrode 4 included a glass substrate 1, an ITO layer 2 functioning as a transparent electrode and formed on the surface of the glass substrate 1 by spatter vapor deposition, and a thin film of tungsten oxide 3 formed over the ITO layer 2 by vapor deposition with an electron beam as shown in FIG. 1.

A proton-doped thin film of tungsten oxide ($H_xWO_3$) synthesized in the following manner was used as a counter electrode 8 (FIG. 2).

In the same manner as used in the working electrode 4, an ITO electrode 6 and then a thin film of tungsten oxide 7 were formed on the surface of a glass substrate 5. The glass substrate 5 with the ITO electrode 6 and the thin film of tungsten oxide 7 formed thereon was soaked in an aqueous solution of hexachloroplatinic acid ($H_2PtCl_6$) and then dried in a stream of hydrogen, so that tungsten oxide was converted to tungsten bronze ($H_xWO_3$).

An electrolyte layer 9 of the electrochromic display element was formed according to the method described below.

A toluene solution of SEBS was added to the phosphoric acid-doped silica gel obtained in Example 1. Alumina powder was further added to the silica gel at a weight ratio of 10% to color the electrolyte layer 9 white, since the electrolyte layer 9 also served as a reflector of the electrochromic display element. The mixture was kneaded to a slurry, which was applied in a thickness of 50 μm onto the surface of the working electrode 4 with a doctor blade to form the electrolyte layer 9.

The counter electrode 8 was joined with the working electrode 4 to cover the electrolyte layer 9 formed on the surface of the working electrode 4. After evaporation of toluene under reduced pressure, the laminate was sealed on its end faces with an ultraviolet curing resin 10 to complete the electrochromic display element. FIG. 2 shows a cross-section of the resultant electrochromic display element. The working electrode 4 and the counter electrode 8 were respectively connected to lead terminals 11 and 12.

A working cycle test was carried out for the electrochromic display element thus obtained. The working cycle test repeats application of a voltage of −1V to the working electrode 4 against the counter electrode 8 for 2 seconds to color the working electrode 4 and then a voltage of +1V to the working electrode 4 for another 2 seconds to achromatize the working electrode 4. No deterioration of the performance, that is, no deterioration of the chromatic and achromatic properties, was observed in the electrochromic display element even after the test of 10,000 cycles.

Thus, an effective electrochromic display element was obtained using the protonic conductor of the present invention.

[EXAMPLE 10]

Figure 3:
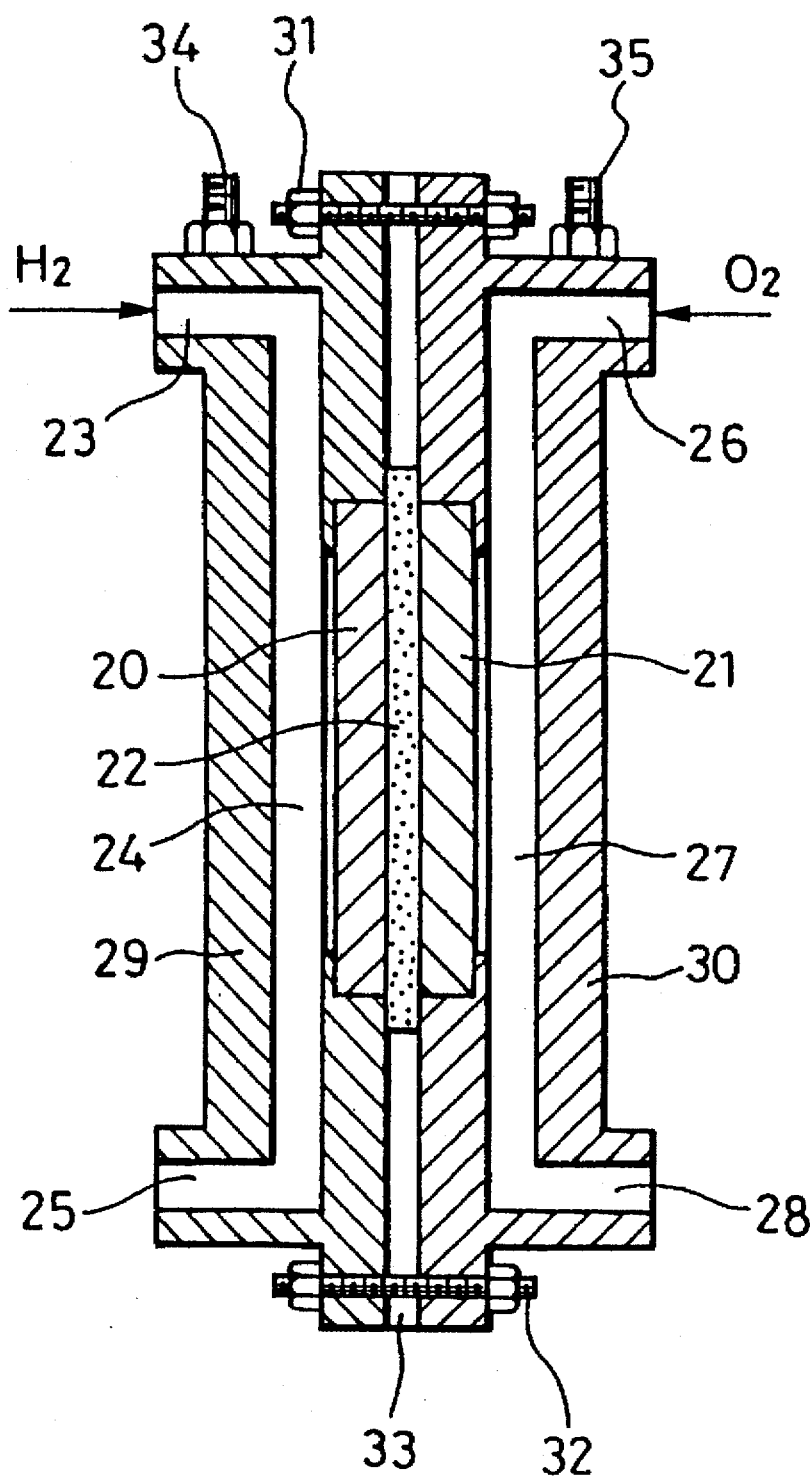
FIG. 3 is a vertical cross-sectional view illustrating an oxygen-hydrogen fuel cell prepared in Example 10.

An oxygen-hydrogen fuel cell having the cross-section shown in FIG. 3 was prepared from the protonic conductor obtained in Example 1.

The phosphoric acid-doped silica gel of Example 1 was mixed with a toluene solution of SEBS and kneaded to a slurry. The slurry was applied in a thickness of 50 μm onto the surface of a polytetrafluoroethylene plate with a doctor blade. After evaporation of toluene under reduced pressure, the applied film was peeled off the polytetrafluoroethylene plate and used as an electrolyte layer 22 of the fuel cell.

Gas diffusion electrodes 20 and 21 used herein were those with platinum of 0.35 mg/$cm^2$ carried thereon (manufactured by E-Tech Corporation). The same silica gel as that used for the preparation of the electrolyte layer 22 was dispersed in a toluene solution of SEBS. The resultant dispersion was sprayed onto the gas diffusion electrodes 20 and 21, which were then dried under reduced pressure. The gas diffusion electrodes 20 and 21 and the electrolyte layer 22 interposed therebetween were hot-pressed at a temperature of 150° C. to yield a fuel cell element.

As shown in FIG. 3, the fuel cell element thus obtained was interposed between a first stainless steel block 29 with an $H_2$ gas inlet 23, a fuel chamber 24 and an $H_2$ gas outlet 25 and a second stainless steel block 30 with an $O_2$ gas inlet 26, an oxygen chamber 27 and an $O_2$ gas outlet 28. The laminate was then clamped with a pair of fiber-reinforced plastic clamping rods 31 and 32 with electrically insulating properties to form a test fuel cell. The test fuel cell further includes a drain for $H_2O$ 33, an anode terminal 34, and a cathode terminal 35.

Figure 4:
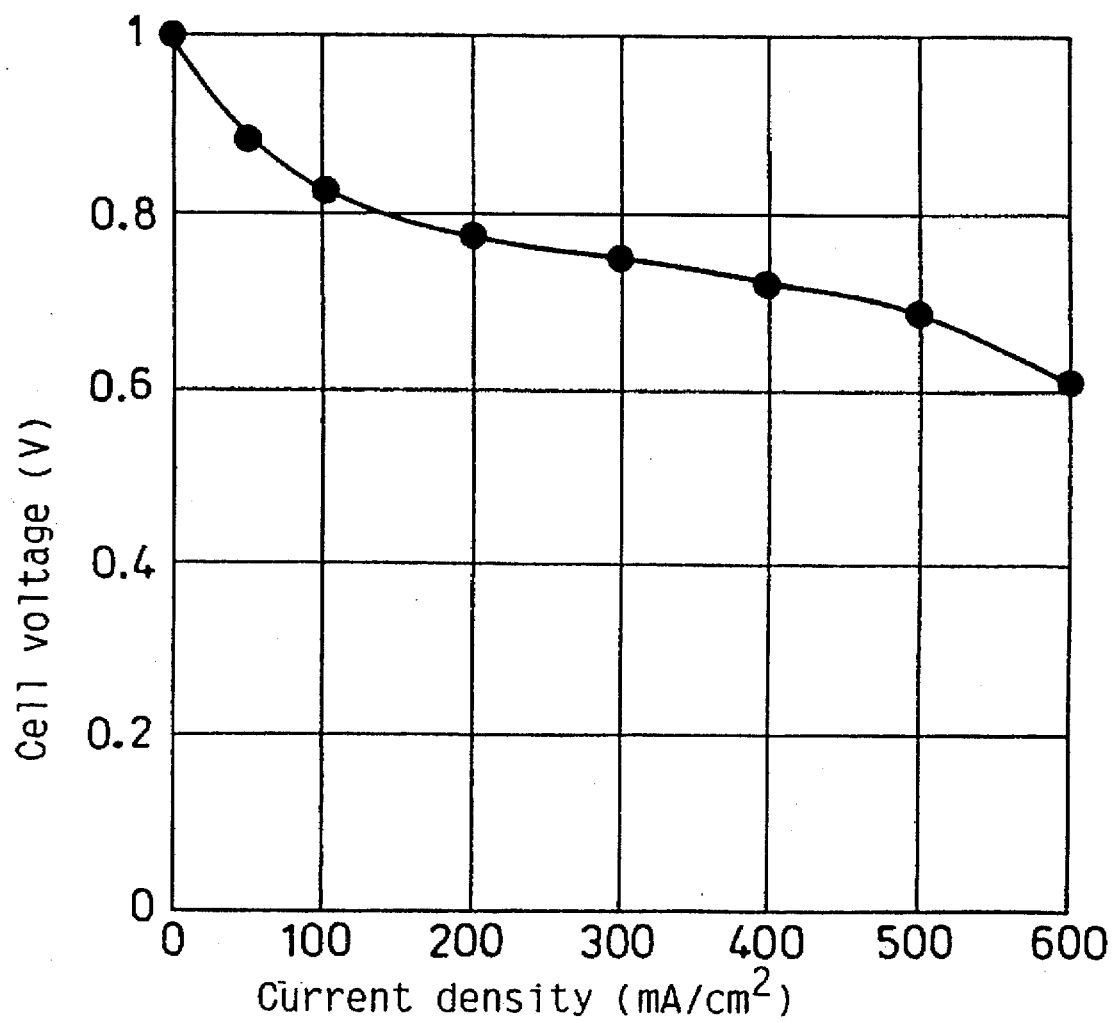
FIG. 4 shows a current-voltage curve representing the properties of the oxygen-hydrogen fuel cell.

The relationship between the output current and the voltage of the test fuel cell was measured by feeding gaseous hydrogen pressurized to 3 atmospheres to the fuel electrode and the air pressurized to 5 atmospheres to the air electrode. The voltage-current curve obtained is shown in FIG. 4.

The test fuel cell showed a voltage of over 0.7V against the electric current of 400 mA/$cm^2$. This means that the fuel cell obtained in Example 10 has high output chereceteristics.

Thus, a fuel cell of excellent properties was obtained using the protonic conductor of the present invention.

Although the styrene-ethylene-butene-styrene copolymer, hydrogenated styrene-butadiene copolymer, and styrene-butadiene block copolymer were used as the thermoplastic elastomer in the above examples, other thermoplastic elastomers may also be used to exert similar effects. The present invention is not restricted in any sense to the thermoplastic elastomers used in the examples.

Although phosphoric acid, its derivatives, and perchloric acid were used as the Brønsted acid in the above examples, other Brønsted acids, such as boric acid and silicic acid, and mixtures of these Brønsted acids may also be used to exert similar effects. The present invention is not restricted in any sense to the Brønsted acids used in the examples.

In the above examples, the electrochromic display element and the fuel cell were described as typical examples of electrochemical elements using the protonic conductor of the present invention, the protonic conductor of the present invention may also be applicable to other electrochemical elements like pH sensors. The present invention is not restricted in any sense to the electrochemical elements described in the examples.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A protonic conductor comprising a silicon oxide doped with a Brønsted acid and a thermoplastic elastomer.

2. A protonic conductor in accordance with claim 1, wherein said Brønsted acid comprises phosphoric acid or a derivative thereof.

3. A protonic conductor in accordance with claim 1, wherein said Brønsted acid comprises perchloric acid or a derivative thereof.

4. A protonic conductor in accordance with claim 1, wherein said silicon oxide doped with said Brønsted acid is synthesized by a sol-gel method.

5. An electrochemical element comprising a pair of electrodes and a protonic conductor in accordance with claim 1 interposed between said pair of electrodes.

6. An electrochemical element comprising a pair of electrodes and a protonic conductor interposed between said pair of electrodes, wherein said protonic conductor comprising a silicon oxide doped with a Brønsted acid and a thermoplastic elastomer.

7. An electrochemical element in accordance with claim 6, wherein said Brønsted acid comprises phosphoric acid or a derivative thereof.

8. An electrochemical element in accordance with claim 6, wherein said Brønsted acid comprises perchloric acid or a derivative thereof.

9. An electrochemical element in accordance with claim 6, wherein said silicon oxide doped with said Brønsted acid is synthesized by a sol-gel method.

* * * * *